United States Patent [19]

Takahashi et al.

[11] Patent Number: 5,105,270
[45] Date of Patent: Apr. 14, 1992

[54] SYNCHRONOUS IMAGE INPUT METHOD AND SYSTEM THEREFOR

[75] Inventors: Isao Takahashi, Fujisawa; Akira Sema, Yokohama, both of Japan

[73] Assignee: Nippon Avionics Co., Ltd., Tokyo, Japan

[21] Appl. No.: 499,820

[22] Filed: Mar. 27, 1990

[51] Int. Cl.$^5$ .......................... H04N 5/33; H04N 3/8
[52] U.S. Cl. ..................... 358/113; 358/110; 358/206; 358/199; 250/334; 359/217
[58] Field of Search ................ 358/113, 110, 205–208, 358/106, 107, 83, 199; 250/334, 333, 332, 331, 330; 382/1; 350/6.5

[56] References Cited

U.S. PATENT DOCUMENTS

| | | | |
|---|---|---|---|
| 3,626,091 | 12/1971 | Casper | 358/113 |
| 3,786,269 | 1/1974 | Cooper | 250/334 |
| 3,798,366 | 3/1974 | Hunt et al. | 358/206 |
| 3,804,976 | 4/1974 | Gard | 358/206 |
| 3,875,330 | 4/1975 | Dahlquist et al. | 358/113 |
| 3,935,382 | 1/1976 | Hunt | 358/113 |
| 4,365,307 | 12/1982 | Tatsuwaki et al. | 358/110 |
| 4,520,504 | 5/1985 | Walker et al. | 358/113 |
| 4,701,612 | 10/1987 | Sturgill | 358/106 |

*Primary Examiner*—James J. Groody
*Assistant Examiner*—Michael H. Lee
*Attorney, Agent, or Firm*—Oblon, Spivak, McClelland, Maier & Neustadt

[57] ABSTRACT

This invention relates to an image input method and a system therefor for raster-scanning an object which makes periodical movements and for obtaining thermal images thereof. The invention comprises the steps of taking in such periodical movements of the object as trigger signals for each revolution period, controlling the scanning speed of a raster scanning mechanism in accordance with the period of such trigger signals, reading arbitrary and different partial images for each of the raster scanning by the mechanism using the trigger signals as references when synchronization is fully established, and synthesizing imagers for one frame to display thermal images on a TV monitor screen.

5 Claims, 5 Drawing Sheets

SYNCHRONOUS IMAGE INPUT METHOD AND SYSTEM THEREFOR

BACKGROUND OF THE INVENTION

1. Field of the Invention

This invention relates to an image input method for inputting and displaying images of an object which makes periodical movements on a TV monitor screen and to a synchronous image input system for realizing the method.

2. Discussion of the Background

There are known various methods for imaging an object in order to detect a temperature thereof and for displaying temperature distribution thereof in thermal images. If the object is rotating, it is necessary to measure temperature on various locations of the object while it is rotating because if the movement is suspended, the temperature distribution might change.

As a prior art system for detecting infrared radiation from an object with raster scanning and imaging the temperature at various points, there is known an optical mechanical raster scanning system disclosed in U.S. Pat. No. 3,626,091 which can detect temperatures of a rotating object. FIG. 5 shows the principle of a camera head of the raster scanning system. The system shown in the figure is capable of obtaining one frame of image (one screen) in real time of 1/20 sec. by means of a polygonal rotary mirror 1 which is driven by a motor and which has ten faces and an infrared detector 2 having ten component elements. Each element of the infrared detector 2 detects one portion obtained by dividing an image vertically into ten. When the rotary mirror having ten faces rotates once, infrared images for one frame are scanned. More specifically, infrared video images 3 may be obtained simultaneously from each of the ten elements. Each of the ten faces of the mirror 1 is arranged at an angle slightly staggered from each other in the vertical direction (the direction of mirror axis). Interlacing among these ten portions may be conducted by using the slight angle differences between ten faces of the rotary mirror. The infrared detector converts infrared energy 5 focused by a focusing lens 4 into electric current, amplifies the current by a preamplifier 6, and transmits it via a cable to a processor 7 which processes signals. The reference numeral 8 denotes a silicon window directed toward an object (not shown) and reference numeral 9 denotes a reflector. The camera head sends out two types of synchronous signals to the processor 7. One is PV signal 10 which is given one pulse for one revolution of the mirror 1, and the other is synchronous PH signal 11 given to respective faces of the mirror indicating a blanking period of mirror faces and an unblanking period thereof with thermal image signals of the object. PH signlas are generated in the number of ten pulses for one revolution of the rotary mirror 1. The processor 7 controls writing in the image memory based on those two synchronous signals.

There is also known an infrared video system of digital memory type disclosed in Japanese Patent lay-open No. Sho55-31336 (1980) which stores video signals for one frame in a digital memory, repeatedly reads them out at a high speed, converts them into Japanese Standard Television signals, displays them on a monitor TV screen, and re-writes input video data utilizing blanking periods of TV signals in order to display sequentially new images along with the scanning at the input.

However, although the above mentiond optical-mechanical raster scanning system can detect thermal images in real time as fast as 1/20 sec. for one frame composition, the system cannot always provide precise thermal images if the object moves or the temperature thereof changes during the period of 1/20 sec. As the camera head takes in the images by mechanically scanning infrared images, it has technological limitations in reducing the frame scanning time, thus posing a problem in cost reduction.

SUMMARY OF THE INVENTION

This invention aims at providing an image input method and a system therefor which can provide precise thermal images even if an object moves or physically changes (e.g. changes in temperature) quickly by taking in partial thermal images of a periodically moving object into an image memory for one period and then synthesizing them.

The image input method according to this invention displays physical images obtained by mechanically raster-scanning an object on a TV monitor screen, and is characterized in that physical changes of the object are taken in for each period in the form of trigger signals, the mechanical raster scanning mechanism is driven in synchronization with the trigger signals, arbitrary but different partial images of the scanning mechanism are stored in a memory for each period of the trigger signals and the memory images are synthesized for one whole frame to form the physical images for display on a TV monitor screen. The image input system according to this invention for obtaining physical images by mechanically raster-scanning an object and displaying them on a TV monitor screen comprises a sensor which detects periodical physical changes of an object for each period and outputs trigger signals, a counter which counts intervals between trigger signals of the sensor, a coefficient setting circuit which divides the trigger signal intervals by a unit scanning time composing one frame of the raster scanning mechanism and designating different unit scanning frames as the raster scanning proceeds, a target setting circuit which divides the trigger signal interval of the counter by the coefficient and sets a target for the unit scanning time forming one frame of the raster scanning mechanism, a controller which inputs the target and the synchronous signals from said raster scanning mechanism and controls the scanning speed, and an image sampling circuit which differentiates the trigger signals from synchronous images synchronized therewith.

DESCRIPTION OF THE PREFERRED EMBODIMENT

A preferred embodiment of this invention will now be described by referring to drawings.

Figure 1:
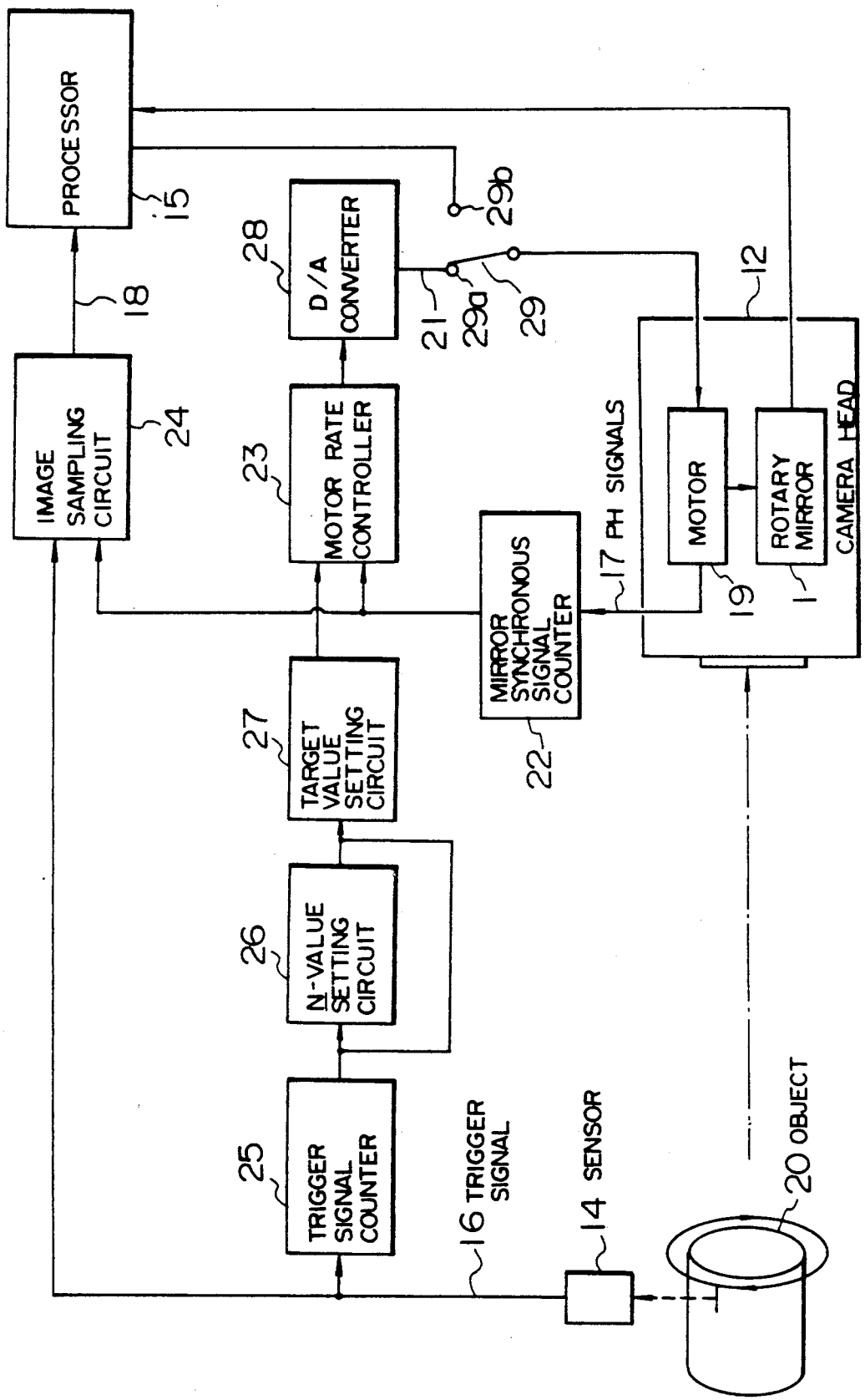
FIG. 1 is a block diagram showing an embodiment of the synchronous image input unit section according to this invention.
Figure 2:
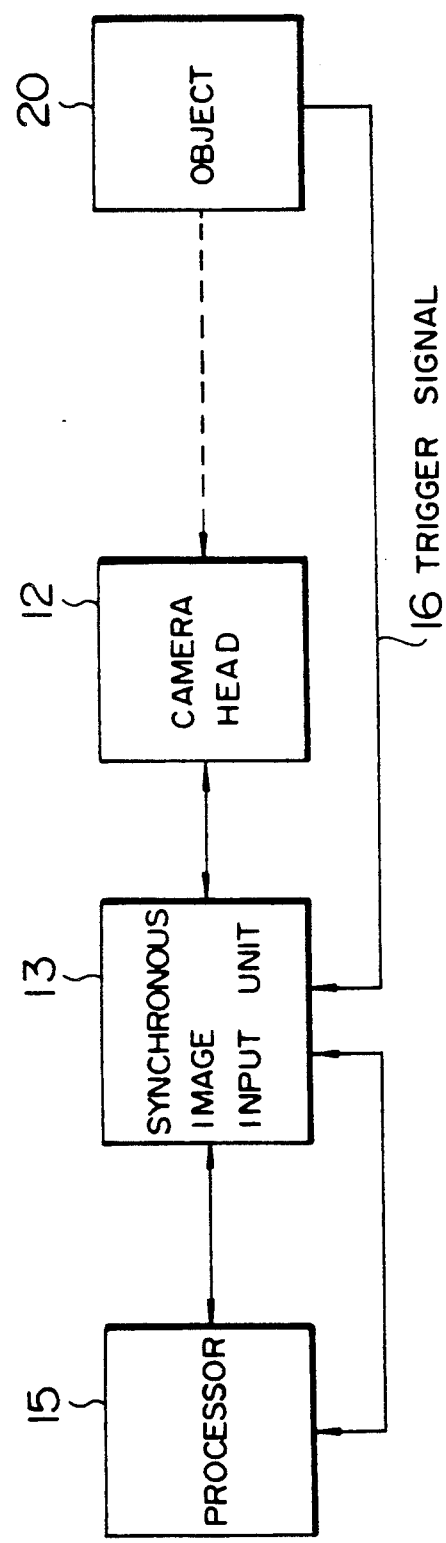
FIG. 2 is a schematic block diagram showing an embodiment of the synchronous image input system according to this invention.
Figure 5:
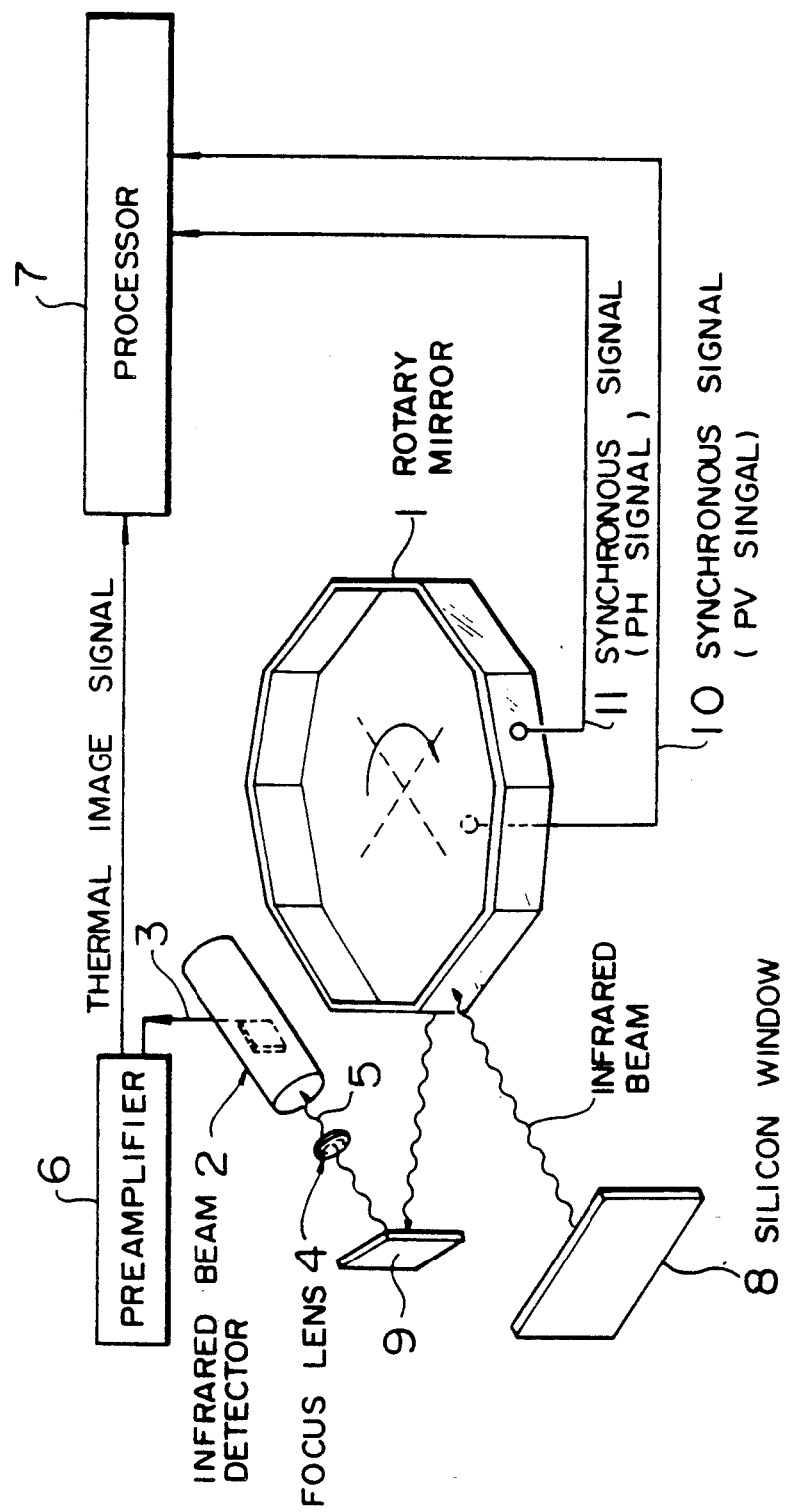
FIG. 5 is a chart to describe the operation principle of a camera head for infrated video system using rotary mirror.

FIG. 2 is a schematic block diagram to show an embodiment of the synchronous image input system according to this invention and FIG. 1 is a block diagram to show a synchronous image input unit thereof. In the following description of the preferred embodiment, a prior art camera head for infrared video system shown in FIG. 5 is used as a section of the camera head. A synchronous image input unit 13 is connected to the camera head 12 aiming at an object 20, and the unit 13 (to be described hereinafter) is connected to a processor 15 having a CRT display via cables as shown in FIG. 2. The object 20 is a revolving heating element, infrared energy therefrom is taken in by the camera head 12, and signals (trigger signals) 16 corresponding to the revolution period of the object 20 are inputted at the synchronous image input unit 13. The revolution period of the object is first detected by a sensor 14 which is capable of detecting a signal of a revolution period, such as a tachometer, trigger signals 16 corresponding to the period and PH signals 17 of the rotary mirror within the camera head 12 are inputted at the unit 13, and freeze signals 18 which will be described hereinafter and motor control voltage signals 21 of the driving motor 19 of the mirror 1 are outputted respectively from the unit 13 to the processor 15 and to the camera head 12. PH signals are used to detect the revolution of the mirror 1 and to control the freeze signals 18. The PH signals 17 are taken in by a mirror synchronous signal counter 22 within the unit 13, and transmitted to a motor speed controller 23 and an image sampling circuit 24 which outputs freeze signals 18.

A driving motor 19 is synchronized in revolution number with the object in a predetermined relation as the revolutional rate thereof is controlled by a motor speed controller 23 at a target speed which is set by a motor speed target value setting circuit 27 by means of the trigger signal 16 via a trigger counter 25 and a coefficient (n-value) setting circut 26, and is outputted to the motor 19 via a D/A converter 28. The freeze signal 18 controls in such a manner that only synchronized thermal images are inputted at the image memory of the processor 15 while other images are to be discarded. This causes the synchronized thermal images alone to be stored in the memory to synthesize thermal images which are synchronized. The revolutional number of the rotary mirror 1 may easily be controlled with a motor voltage if a DC servomotor is used as the motor 19 for the mirror 1.

In FIG. 1, the trigger signals 16 from the sensor 14 are counted in intervals by a trigger signal counter 25. The circuit 26 sets a coefficient (n-value) which designates different partial images (unit scanning frame) as the revolution of the mirror 1 advances by dividing the trigger signal intervals fed from the counter 25 with a unit scanning time. The circuit 27 sets a target value of the motor revolution speed or the target value of the unit scanning time composing one frame of the mirror 1 by dividing the trigger signal intervals by the coefficient or the output data from the counter, and outputs the value to the motor rate controller 23.

Figure 3:
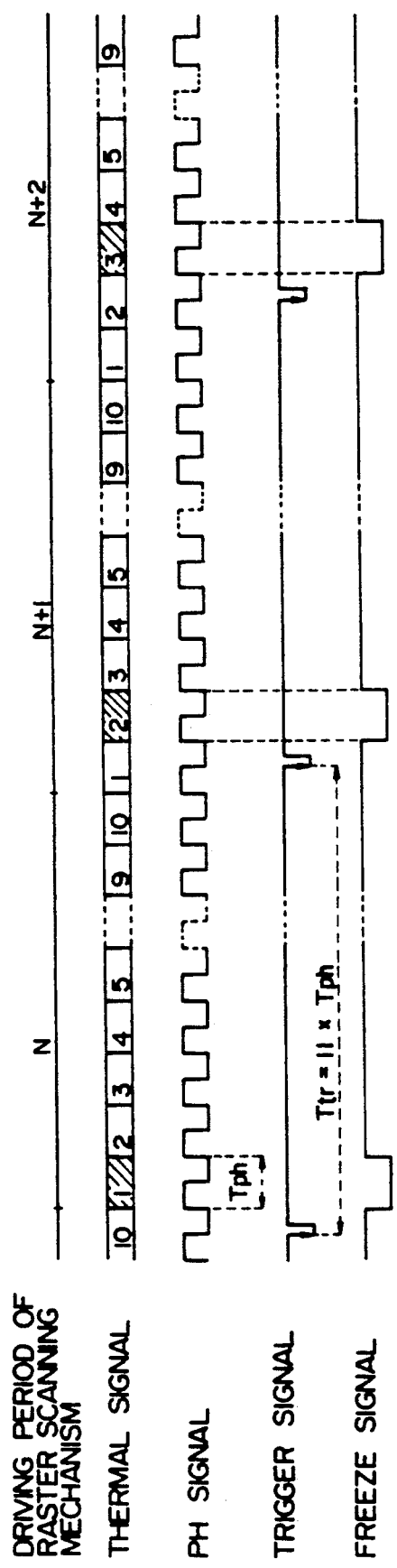
FIG. 3 is a time chart of various signals used in this invention.

Referring now to FIG. 3, the control method of the motor will be described in more detail.

FIG. 3 partially shows the timing chart of various signals using the trigger signals 16 as the reference. In the figure, the reference numerals 1 to 10 denote those generated by scanning faces of the rotary mirror 1. In the figure, immediately after the input of the trigger signal 16, thermal images for one frame of one face of the mirror 1 are inputted. A synchronized image is completely synthesized by inputting all the thermal image signals from faces 1 to 10. Synchronized images can be inputted extremely effectively if all the thermal images from faces 1 to 10 are inputted by the time the trigger signals 16 have been inputted for ten times. In order to realize this, the period of the trigger signals (Ttr) and the revolution time (Tph) for one face of the rotary mirror 1 should satisfy the following equation:

$$Ttr = n \cdot Tph$$

where n denotes an integer which is 7 or more and has 1, 3, 7 or 9 at the least significant digit. The embodiment shown in FIG. 3 is related to a case where n=11, wherein thermal image signals (shown by shaded portion) of the first face of the ten face rotary mirror 1 are taken in, then the mirror is revolved by (1+1/10) revolutions to take in thermal image signals of the second face, then the mirror 1 is revolved by (1+1/10) times to take in thermal image signals of the third face. Thermal images from the first to tenth faces are taken in similarly and synthesized. However, this invention is naturally not limited to the mode shown above, but thermal image signals may be taken in alternatedly from the first, the third and the fifth face . . . to finally obtain synthesized images for all ten faces.

As the trigger signal 16 is taken out of the object 20, the period thereof (Ttr) must be considered variable. The equation shown above means that the revolution time for one face of the rotary mirror 1 is controlled in relation (n) to the period (Ttr) of the trigger signal. More particularly, the revolution number of the mirror 1 may be controlled in accordance with the period of the trigger signals 16 to effectively input synchronized images.

Figure 4:
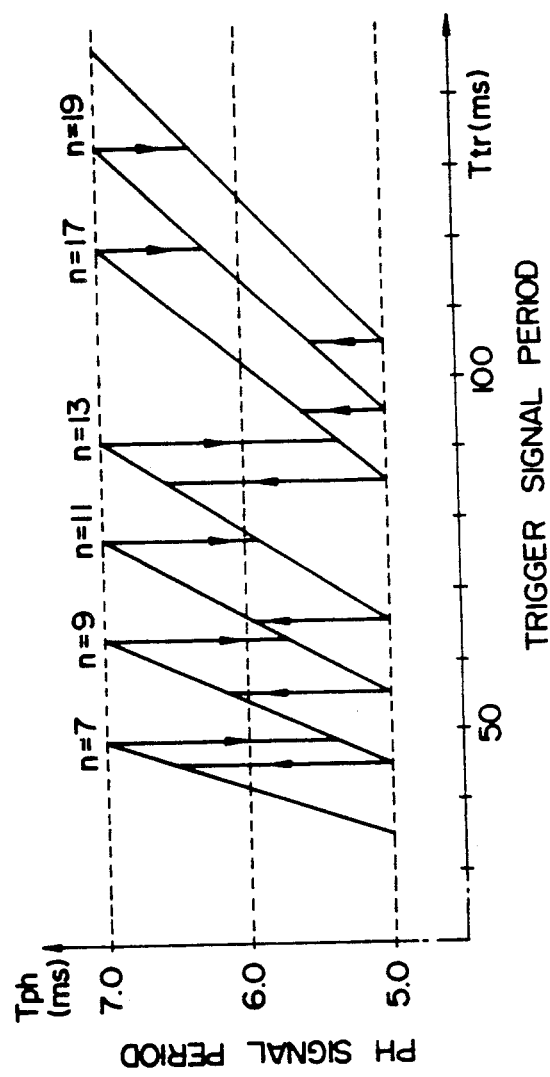
FIG. 4 is a graph to indicate the relation of the period of trigger signals and the time required for scanning one face of the rotary mirror for respective coefficients.

As the revolution number of the rotary mirror 1 varies the frame rate or the scanning time, it is not desirable to change it excessively for control purpose. The revolution of the rotary mirror 1 is limited to 20/sec. or Tph=5 ms maximum and to 14.3/sec. or Tph=7 ms minimum. If it should exceed the limitations for control purpose, the coefficient n should be reset so as not to exceed the limitations. FIG. 4 shows such a state. The motor voltage is controlled as described above simply by obtaining the revolutional speed of the mirror 1 and the coefficient n out of the period of the trigger signal 16.

In order that the method of this invention may be applied not only to synchronization but also to the input of unsynchronized images, there is provided a mode switch 29. When it is switched from synchronized mode 29a to unsynchronized mode 29b, the revolutional speed of the mirror 1 is not controlled but the mirror 1 is revolved by the standard driving voltage from the processor 15. When the object is rotating and if it is desired to input synchronized images at a location where the object rotates one half cycle instead of the time the trigger signal 16 comes, it is simply added with a phase control function by taking in images in suitably staggered phases from the trigger signal 16.

When the period of the trigger signal 16 is extensive, the synchronized thermal images may be obtained stably although it takes time. Conversely, when the period is short and the movements or changes are quick, there arises a problem of motion limitation. In such a case, quick trigger signals which are short in period should be divided by the trigger dividing function before input.

Application examples are described hereinbelow.

(a) Revolving Object Such as a Tire

The temperature distribution on a tire or other similar revolving object may be observed by this invention system. Trigger signals may be taken out by a reflective type sensor by pasting a reflector on the object or using input pulses at a tachometer which measures the revolution number. Thermal images at an arbitrary revolutional position may be obtained if a phase is suitably selected.

(b) Parts of Engine or Automobile

This invention system may observe the temperature or temperature distribution on an engine or a part thereof when the engine is in a certain state (such as when a cylinder is in exhaust stroke). Thermal images may be inputted in synchronization with the operation of the engine. Synchronization is achieved simply by inputting pulses of an ignition plug of the particular cylinder as trigger signals. Various strokes of an engine may be observed from the pulses of the ignition plug by selecting the phases suitably. In the case of an engine having four cycles, the strokes of suction, compression, explosion and exhaust are arranged for each phase of 90 degree.

(c) Electronic Parts

The thermal head of a printer is related to the speed and quality of the print. Hybrid ICs present a heat generation problem as a large current flows through it instantaneously. Thermal heads and hybrid ICs have common characteristics in that the portion where heat is generated has a small thermal capacity and excellent thermal conductivity. Temperature changes quickly at such parts. A synchronized image input unit can catch changes in temperature chronologically. Time passage and heat generation may be observed from the driving pulses by changing phases. One cycle of driving pulses takes 360 degree in time and the time and phase from the driving pulses are proportional to each other.

As described in the foregoing statement, according to this invention, when temperature distribution on an object which physically changes in period is imaged in thermal images, trigger signals from the object are inputted, a scanning speed of a raster scanning mechanism is controlled in accordance with period of such trigger signals, and an arbitrary portion of partial images are taken in for one raster scanning of the raster scanning mechanism referring to the trigger signals when syncronization is completely established, and images are synthesized for one frame. Therefore, thermal images are effectively and precisely obtained without being influenced from mechanical limitation of the raster scanning mechanism.

What is claimed is:

1. An image input system for mechanically raster-scanning an object, obtaining physical images and displaying the images on a TV monitor screen, comprising a sensor which detects periodical and physical changes of an object and outputting trigger signals, a counter which counts trigger signal intervals of said trigger signals, a coefficient setting circuit which divides the trigger signal intervals from said counter by a reference unit scanning time composing one frame of the raster scanning mechanism and designates unit scanning frames which differ from each other chronologically as the raster scanning operation proceeds, a target value setting circuit which divides the trigger signal intervals by said coefficient and sets a target value of the unit scanning time composing one frame of said raster scanning mechanism, a controller which inputs synchronous signals of said target value and said raster scanning mechanism and controls scanning speed, and an image sampling circuit which differentiates synchronized images from said trigger signals.

2. The image input system as claimed in claim 1 wherein said physical images are thermal images radiated from said object.

3. The image input system as claimed in either claim 1 or 2 wherein said sensor detects periodical changes in revolution of said object and outputs them as said trigger signals.

4. The image input system as claimed in either one of claims 1 or 2 wherein said sensor detects periodical pulses which drive said object for each period and outputs them as said trigger signals.

5. The image input system as claimed in claim 3 wherein said sensor detects periodical pulses which drive said object for each period and outputs them as said trigger signals.

* * * * *